United States Patent
Uihlein et al.

(10) Patent No.: US 8,356,741 B2
(45) Date of Patent: Jan. 22, 2013

(54) METHOD FOR PRODUCING A BLADE PLATING ON A BLADE FOR A TURBOMACHINE

(75) Inventors: Thomas Uihlein, Dachau (DE); Erich Steinhardt, München (DE); Werner Humhauser, Moosburg (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 13/201,424

(22) PCT Filed: Feb. 2, 2010

(86) PCT No.: PCT/DE2010/000104
§ 371 (c)(1),
(2), (4) Date: Aug. 12, 2011

(87) PCT Pub. No.: WO2010/091659
PCT Pub. Date: Aug. 19, 2010

(65) Prior Publication Data
US 2011/0290861 A1     Dec. 1, 2011

(30) Foreign Application Priority Data
Feb. 14, 2009   (DE) .......................... 10 2009 008 887

(51) Int. Cl.
*B23K 31/02* (2006.01)
*B23P 15/02* (2006.01)

(52) U.S. Cl. .................. 228/122.1; 228/176; 228/262.9; 29/889.71

(58) Field of Classification Search ................ 228/176, 228/122.1, 262.9; 29/889.71
See application file for complete search history.

(56) References Cited

U.S. PATENT DOCUMENTS

| | | | |
|---|---|---|---|
| 3,743,556 A | 7/1973 | Bailey et al. | |
| 3,876,447 A | 4/1975 | Lally | |
| 5,346,119 A | 9/1994 | Koschlig et al. | |
| 5,359,770 A | 11/1994 | Brown et al. | |
| 5,400,505 A * | 3/1995 | Wei et al. | 29/889.2 |
| 5,547,625 A | 8/1996 | Gleissner et al. | |
| 2008/0263865 A1 * | 10/2008 | Daniels et al. | 29/889.71 |

FOREIGN PATENT DOCUMENTS

| | | |
|---|---|---|
| DE | 4439950 A1 | 5/1996 |
| DE | 102005030848 A1 | 1/2007 |
| EP | 0276381 A2 | 8/1988 |

OTHER PUBLICATIONS

PCT: International Search Report and Written Opinion of PCT/DE2010/000104; Jun. 23, 2010; 21 pages (including English translation and translation certification).

* cited by examiner

*Primary Examiner* — Nicholas P D'Aniello
(74) *Attorney, Agent, or Firm* — Howison & Arnott, L.L.P.

(57) ABSTRACT

The invention relates to a method for producing a blade tip plating (20) on a blade (10) for a turbomachine, in particular on a high-pressure rotating compressor blade for a gas turbine, comprising the following steps: —producing a particle composite material (24) having embedded hard material particles (18); —placing the panicle composite material (24) on a solder (30) applied to the blade tip (16); and—healing the solder (30).

8 Claims, 3 Drawing Sheets

METHOD FOR PRODUCING A BLADE PLATING ON A BLADE FOR A TURBOMACHINE

CROSS-REFERENCE TO RELATED APPLICATIONS

This application is a U.S. National Phase application submitted under 35 U.S.C. §371 of Patent Cooperation Treaty application serial no. PCT/DE2010/000104, filed Feb. 2, 2010, and entitled METHOD FOR PRODUCING A BLADE PLATING ON A BLADE FOR A TURBOMACHINE, which application claims priority to German patent application serial no. DE 10 2009 008 887.3, filed Feb. 14, 2009, and entitled VERFAHREN ZUM HERSTELLEN EINER SCHAUFELPANZERUNG AUF EINER SCHAUFEL FÜR EINE TURBOMASCHINE.

Patent Cooperation Treaty application serial no. PCT/DE2010/000104, published as WO 2010/091659, and German patent application serial no. DE 10 2009 008 887.3, are

TECHNICAL FIELD

The invention relates to a method for producing a blade tip plating on a blade for a turbo machine, particularly on a high-pressure running compressor blade for a gas turbine.

BACKGROUND

A method of this type is known from DE 10 2005 030 848 A1, with which method blade tip platings made of hard material particles can be applied, particularly also blades made of a nickel-based material or of a nickel-based alloy. In this method, first a nickel-based solder is applied to a blade made of a nickel-based material, in the region of the blade tip. Hard material particles comprising cubic boron nitride (CBN), coated with an active element, are then applied to the solder. When the solder is subsequently melted under a vacuum or protective gas to form a matrix that encompasses the hard material particles, a stable connection is produced between the hard material particles and the blade tip.

DE 44 39 950 C2 shows a method for producing a blade tip plating on a blade made of a titanium-based alloy. A solder is applied in layers to the blade. Hard material particles are then applied to the blade that is coated with the solder. The components of the solder are then melted, in order to encase the hard material particles within a matrix.

In the method known from DE 44 39 950 C2, to affix the hard material particles on the layers on the blade side, an outer layer of adhesive (thermoplastic plastic) is applied, wherein the actual adhesion can take place during or after covering. In contrast, individual hard material particles that are covered with a metal coating or a metallic pre-coating are affixed onto the surface of the blade is carried out via resistance welding. However, the hard material particles can also be mixed with a paste consisting of fluxing agent and the elemental components of the solder in powdered form, and then applied to the surfaces, before melting is carried out.

In principle, the need exists for an automation of the application of the hard material particles, since manually covering a film solder with individual hard material particles is a time-consuming and therefore costly process. However, more cost-effective methods, such as the galvanic application of hard material particles in a metallic matrix, result in a complete covering of the blade tip with hard material particles; the hard material particles cannot be selectively positioned at a feasible cost. A complete covering is undesirable, as it results in a substantial negative impairment of the fatigue strength of the blade.

SUMMARY AND DESCRIPTION

The problem addressed by the invention is that of simplifying the production of an optimal blade tip plating with hard material particles.

This problem is solved by a method for producing a blade tip plating on a blade for a turbo machine, having the features disclosed and claimed herein. Advantageous and expedient embodiments of the method according to the invention are specified in the dependent claims.

The method according to the invention in its most general form comprises the following steps:

Producing a particle composite material having embedded hard material particles;

Placing the particle composite material on a solder applied to the blade tip; and Heating the solder.

A particle composite material within the context of the invention is understood as a unit consisting of a holding material and particles embedded therein.

Using a particle composite material having embedded hard material particles in the production of a blade tip plating has the advantage that the hard material particles need not be manually placed individually on the solder. Applying the hard material particles with a holding material saves fabrication time, while at the same time enabling a selective positioning of the hard material particles, since the particle composite material can be molded either during the production thereof or subsequently as desired. This enables a rapid, selective arrangement of the hard material particles along the so-called skeleton line of the blade tip (which is highly time-consuming and thus expensive when performed manually); thus the best functioning blade tip plating in the compressor region is achieved.

As the holding material for the hard material particles, a preferably thermoplastic plastic is suitable, i.e., the particle composite material contains a preferably thermoplastic plastic in which the hard material particles are embedded. When heated, the plastic can be cast or injected into a suitable mold. If applicable, subsequent molding or bending can also be supported by heating.

According to a preferred first embodiment of the invention, a molded article formed from the particle composite material is placed on the solder. The production of a molded article has the advantage, for example, that the particle composite material to be placed is already in its finished shape, and further processing (cutting to shape, bending) is not necessary.

Preferably, the molded article is produced as elongated and having a curvature which conforms to the shape of the skeleton line of the blade tip.

To produce a molded article of this type, the hard material particles and a preferably thermoplastic plastic material can be introduced into a special mold (e.g., by injection molding), which conforms to the skeleton line of the blade tip.

According to a second embodiment of the invention, a wire-like, pre-shaped formed body from the particle composite material is placed on the solder. This embodiment has the advantage, for instance, that in a preceding process step, a greater quantity of particle composite material that is suitable for placement can be produced in advance. The wire-like formed body can be subsequently adapted to conform to different blade tip designs.

To produce the wire-like formed body, hard material particles can be introduced into a preferably thermoplastic plastic material, and an injection molding tool can be used.

Using a tool, the wire-like formed body can be easily bent according to the above-described understanding such that the curvature conforms to the shape of the skeleton line of the blade tip.

The method according to the second embodiment of the invention can be further optimized in that the wire-like formed body is placed on the blade tip automatically with the help of an optical or touch control system.

BRIEF DESCRIPTION OF THE DRAWINGS

Additional features and advantages are found in the following description and in the attached set of drawings, to which reference will be made. The drawings show.

DETAILED DESCRIPTION

Figure 1:
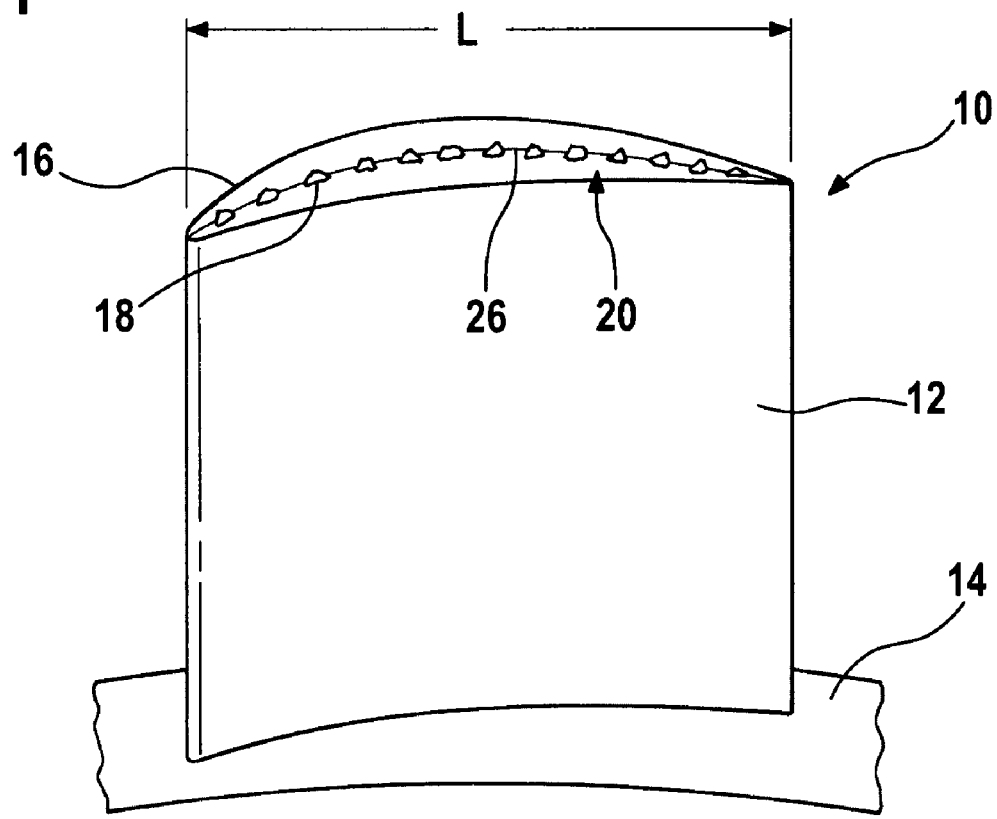
FIG. 1 shows a high-pressure running compressor blade for a gas turbine having a blade tip plating.

FIG. 1 shows a simplified illustration of a running blade 10 for a high-pressure compressor of a gas turbine aircraft engine. The running blade 10 comprises a blade 12 and—referred to the installed state thereof—a blade root 14 positioned radially toward the inside and a blade tip 16 positioned radially toward the outside. To protect the blade tip from wear from stripping in a stationary housing, the blade tip 16 has a plating 20 containing hard material particles 18, which is produced by the method according to the invention. Cubic boron nitride (CBN) is a particularly suitable material for the hard material particles for the plating 20.

In what follows, the production of the blade tip plating 20 according to a first embodiment of the method according to the invention will be described.

Figure 2:
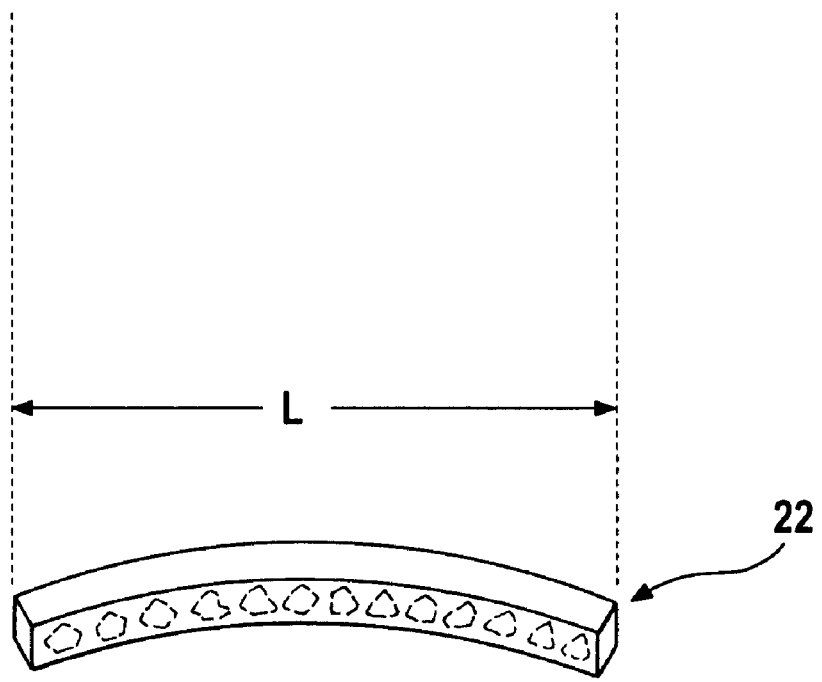
FIG. 2 shows a mold, filled with hard material particles, to be used for producing a molded article made of particle composite material according to a first embodiment of the method according to the invention.

FIG. 2 shows a mold 22 for producing a molded article 24 made of particle composite material. The mold 22 is shape to conform to the blade tip. In particular, the length of the mold 22 corresponds to the length L of the blade tip 16, and the longitudinal curvature of the mold 22 conforms to the shape of the skeleton line 26 of the blade tip 16. Within this context, the skeleton line is understood as the line that connects the centers of circles that can be inscribed within the profile of the blade tip 16 (from a plan view), i.e., the profile shape of the blade tip 16 is symmetrical about its skeleton line 26.

Hard material particles 18, for example, made of CBN, are introduced into the mold 22 in such a way that the hard material particles 18 lie as close to one another as possible. A preferably thermoplastic plastic material 28, which serves as adhesive, is then filled into the mold 22, pressureless or under pressure (on the basis of the property of the material), until said material at least partially encompasses the hard material particles 18. When the plastic material 28 solidifies (hardens), a particle composite material forms, which can be removed from the mold 22 as a molded article 24. To promote this, the mold 22 can be coated with an anti-stick substance and/or can be separable. Because the length of the molded article 24 is significantly greater than its width, it has a wire-like form.

Figure 3:
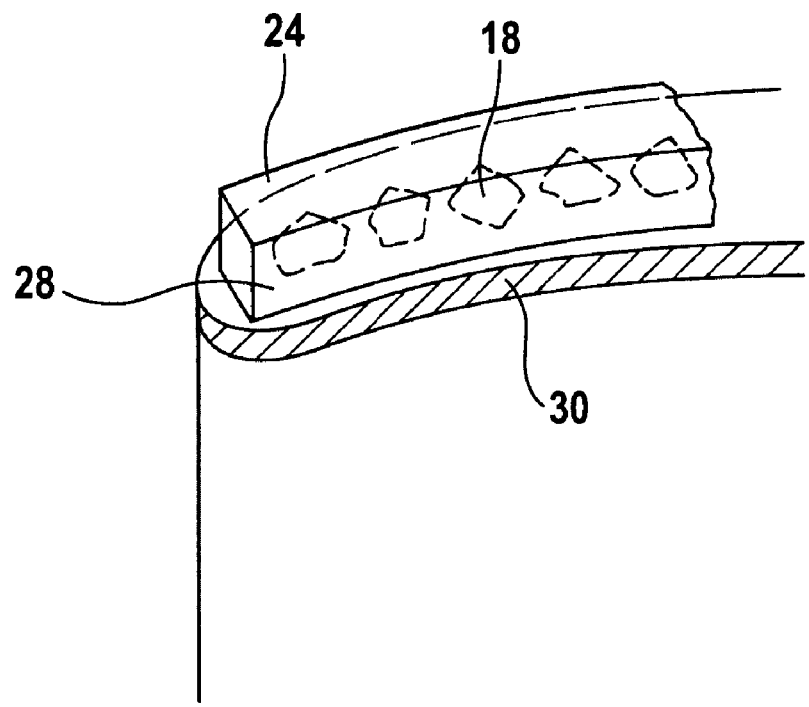
FIG. 3 shows a section of a blade tip with solder film and molded article applied.
Figure 4:
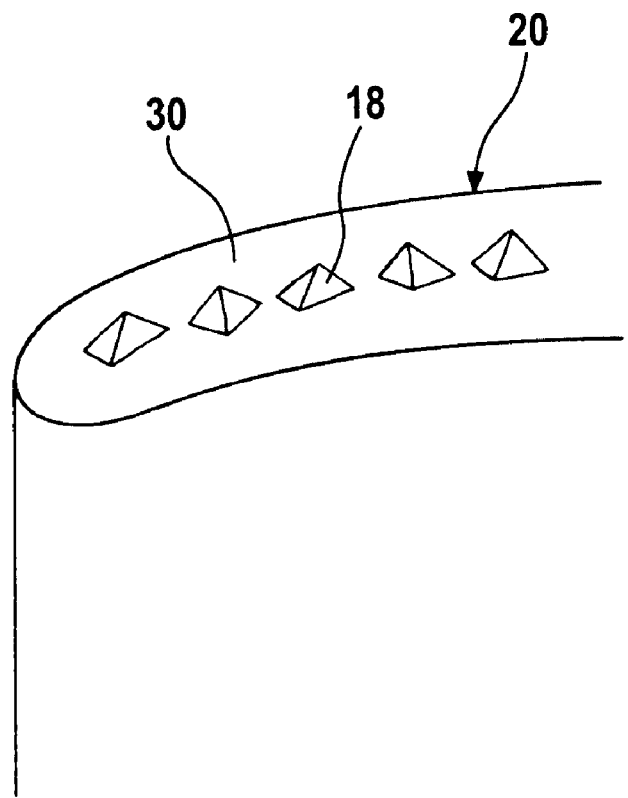
FIG. 4 shows the section of the blade tip of FIG. 3 having hard material particles recessed into the solder film.

The molded article 24 is then fastened to a solder film 30, which has been cut to shape in advance and placed on the blade tip, along the skeleton line 26 of the blade tip 16, as shown in FIG. 3. Inductively heating the solder film 30 causes it to melt, and the hard material particles 18 sink into the molten material of the solder film 30, as shown in FIG. 4. In addition, the plastic material 28 vaporizes and/or burns essentially without residue.

The plating 20 produced in this manner is securely fastened to the blade tip 16, wherein the hard material particles 18 are arranged as desired along the skeleton line 26 of the blade tip 16.

Figure 5:
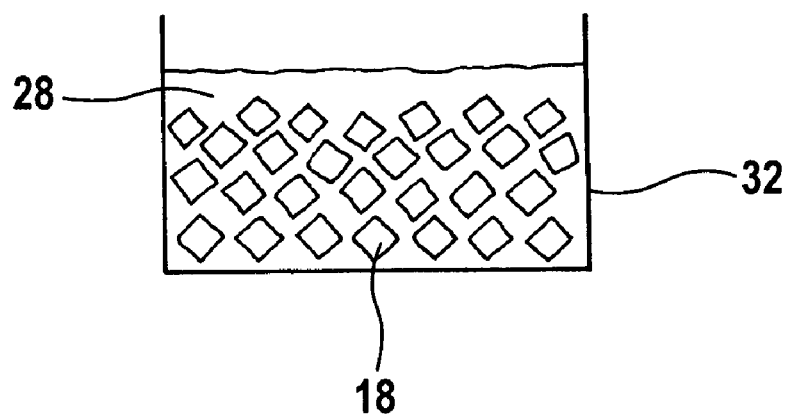
FIG. 5 shows a container with adhesive material and hard material particles for producing a molded article made of particle composite material according to a second embodiment of the method according to the invention.

A second embodiment of the method according to the invention provides an alternative production of the molded article 24. The hard material particles 18 are introduced, for example, in a vessel 32, into a preferably thermoplastic plastic material 28 that serves as adhesive, in such a way that they lie as close to one another as possible, as shown in FIG. 5.

Figure 6:
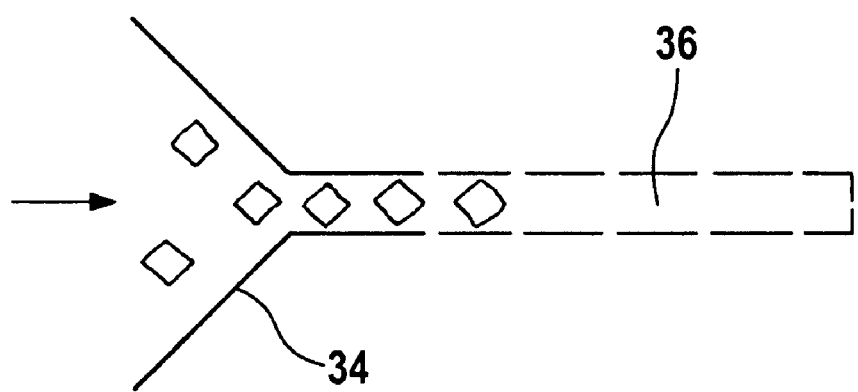
FIG. 6 shows an injection molding device for producing the molded article made of particle composite material according to the second embodiment.

Using an optionally adapted injection molding tool 34, an elongated, preferably wire-like, formed body 36 is molded from the plastic/hard material particle mixture, as shown in FIG. 6. This wire-like formed body 36 is cut to a length that corresponds to the distance between the leading and trailing edges of the blade tip 16.

The wire-like formed body 36 is then shaped in a suitable tool to conform to the shape of the skeleton line 26 of the blade tip 16. The properties of the molded article 24 made of particle composite material and formed in this manner correspond to those of the molded article 24 produced according to the first embodiment. The molded article 24 is accordingly fastened to the blade tip 16 along the skeleton line 26 thereof as was described for the first embodiment, using a solder film 30 and inductive heating thereof.

A length of the wire-like formed body 36 can also be produced in quantity in advance and held in storage wound onto a reel, for example. The wire-like formed body 36 can be applied to a blade tip 16 automatically, in that the wire-like formed body 36 is unwound from the reel, and adaptively placed on the blade tip 16, along the skeleton line 26 thereof, by means of a touch or optical control system. Placement can advantageously be combined with the heating of the solder (soldering) to form a single process step.

According to a further developed aspect of the invention, with a suitable geometry of the blade tip 16, particularly with a largely uniform width over the entire chord length of the blade tip profile, the solder film 30 that has been cut to size can also be replaced by a solder wire. The solder wire can be unwound from a reel and placed on the blade tip 16 using suitable devices (as described above for the wire-like formed body 36 made of particle composite material) and fastened to the blade tip 16 by means of spot gluing. In a subsequent step, the formed body 36 made of particle composite material is then placed on the solder wire, before or as the solder wire is heated.

The invention claimed is:

1. A method for producing a blade tip plating on a blade tip of a blade for a turbo machine, the method comprising the following steps:

producing a particle composite material having a plastic material and embedded hard material particles;

molding the plastic material containing the embedded hard material particles using an injection molding tool;

placing the particle composite material on a solder applied to a blade tip; and heating the solder.

2. The method according to claim 1, wherein the plastic material is a thermoplastic plastic material.

3. The method according to claim 1, further comprising:

producing a wire-like, pre-shaped formed body made of the particle composite material; and wherein the step of placing the particle composite material includes placing the wire-like, pre-shaped formed body on the solder applied to the blade tip.

4. A method for producing a blade tip plating on a blade tip of a blade for a turbo machine, the method comprising the following steps:

producing a particle composite material having embedded hard material particles;

producing a wire-like, pre-shaped formed body made of the particle composite material;

placing the particle composite material on a solder applied to a blade tip, wherein the step of placing the particle composite material includes placing the wire-like, pre-shaped formed body on the solder applied to the blade tip; and heating the solder;

wherein the step of producing the wire-like formed body includes:

introducing the hard material particles into a thermoplastic plastic material; and molding the plastic material containing the hard material particles using an injection molding tool.

5. The method according to claim 3, wherein the step of producing a wire-like formed body includes bending the formed body using a tool in such a way that the curvature of the formed body conforms to a profile of a skeleton line of the blade tip.

6. The method according to claim 3, wherein placing the wire-like formed body on the solder applied to the blade tip is performed automatically using a touch control system or an optical control system.

7. A method for producing a blade tip plating on a blade tip of a blade for a turbo machine, the method comprising the following steps:

producing a particle composite material having embedded hard material particles;

producing a wire-like, pre-shaped formed body made of the particle composite material;

placing the particle composite material on a solder applied to a blade tip, wherein the step of placing the particle composite material includes placing the wire-like, pre-shaped formed body on the solder applied to the blade tip, and wherein placing the wire-like formed body on the solder applied to the blade tip is performed automatically using a touch control system or an optical control system; and heating the solder;

wherein placing the wire-like formed body on the blade tip and heating of the solder are carried out in a single process step.

8. The method according to claim 1, wherein the solder applied to the blade tip is in the form of a solder wire that conforms to a skeleton line of the blade tip.

* * * * *